(12) United States Patent
Chen et al.

(10) Patent No.: US 9,176,842 B2
(45) Date of Patent: Nov. 3, 2015

(54) CONTROL FLOW ANALYSIS UTILIZING FUNCTION DOMINATOR TREES

(71) Applicant: INTERNATIONAL BUSINESS MACHINES CORPORATION, Armonk, NY (US)

(72) Inventors: Qin Yue Chen, Shanghai (CN); Qi Liang, Shanghai (CN); Hong Chang Lin, Shanghai (CN); Feng Liu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 13/721,185

(22) Filed: Dec. 20, 2012

(65) Prior Publication Data
US 2013/0174127 A1 Jul. 4, 2013

(30) Foreign Application Priority Data
Dec. 30, 2011 (CN) .......................... 2011 1 0461369

(51) Int. Cl.
G06F 9/45 (2006.01)
G06F 11/34 (2006.01)
G06F 9/44 (2006.01)

(52) U.S. Cl.
CPC ............ *G06F 11/3466* (2013.01); *G06F 8/443* (2013.01); *G06F 8/75* (2013.01); *G06F 8/433* (2013.01)

(58) Field of Classification Search
None
See application file for complete search history.

(56) References Cited

U.S. PATENT DOCUMENTS 5,448,737 A * 9/1995 Burke et al. ................... 717/146
6,415,433 B1 * 7/2002 Callahan et al. .............. 717/160
(Continued)

FOREIGN PATENT DOCUMENTS

CN 101216803 A 7/2008
CN 101286132 A 10/2008

OTHER PUBLICATIONS

Ferrante et al., "The program dependence graph and its use in optimization", Jul. 3, 1987, ACM Transactions on Programming Languages and Systems (TOPLAS), vol. 9 Issue 3, pp. 319-349.*
Ramalingam et al., "An incremental algorithm for maintaining the dominator tree of a reducible flowgraph", 1994, POPL '94 Proceedings of the 21st ACM SIGPLAN-SIGACT symposium on Principles of programming languages, pp. 287-296.*
(Continued)

*Primary Examiner* — Chameli Das
*Assistant Examiner* — Joanne Macasiano
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A method for control flow analysis according to an embodiment of the present invention includes: acquiring an original function call tree of a program, wherein nodes of the original function call tree represent functions and a parent/child relation between the nodes represents a calling relation; generating a corresponding function dominator tree from the calling relation, wherein nodes of the function dominator tree represent the functions and a parent/child relation between the nodes represents a dominator relation, wherein a first function dominates a second function if all the invocations to the second function are originated by the first function; and simplifying the original function call tree according to the function dominator tree so as to obtain a simplified function call tree. According to an embodiment of the present invention, the function call tree for control flow analysis can be simplified.

12 Claims, 5 Drawing Sheets

(56) References Cited

U.S. PATENT DOCUMENTS

| | | | |
|---|---|---|---|
| 7,496,900 | B2 | 2/2009 | Dimpsey et al. |
| 7,519,961 | B2 | 4/2009 | Alexander, III et al. |
| 7,721,269 | B2 | 5/2010 | Cates |
| 7,747,653 | B2 | 6/2010 | Srinivas et al. |
| 8,826,255 | B1* | 9/2014 | Avadhanula et al. ......... 717/156 |
| 2003/0233640 | A1* | 12/2003 | Reynaud ....................... 717/154 |
| 2006/0053414 | A1* | 3/2006 | Bhandari et al. .............. 717/133 |
| 2007/0006191 | A1* | 1/2007 | Franz et al. ................... 717/146 |

OTHER PUBLICATIONS

Smith, Adam et al., "Test Suite Reduction and Prioritization with Call Trees," ASE ;07, Nov. 5-9, 2007, pp. 539-540.

"Javascript Performance Validator—Call Tree", http://www.softwareverify.com/javascript-profiler-hotspots.php, pp. 1, dated Dec. 12, 2012.

* cited by examiner

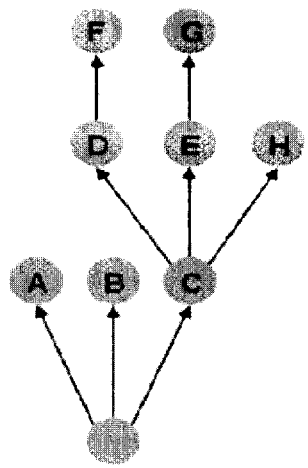
FIG.3 ( c )
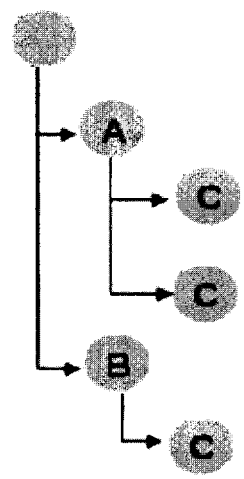
FIG.3 ( d )

CONTROL FLOW ANALYSIS UTILIZING FUNCTION DOMINATOR TREES

PRIOR FOREIGN APPLICATION

This application claims priority from Chinese patent application number 201110461369.9, filed Dec. 30, 2011, which is hereby incorporated herein by reference in its entirety.

BACKGROUND

One or more aspects of the present invention relate to data analysis technology, and more specifically, to a method and apparatus for control flow analysis.

Control flow analysis is an important aspect in performance analysis of a computer program. The basis for the control flow analysis is call relations between the respective functions of the computer program. Those skilled in the art can understand that the functions mentioned here refer to code units which can realize certain functions independently, and can be named methods etc in some situations. A calling function transfers a parameter to a called function, the called function calculates the parameter and returns a result of the calculation to the calling function. Generally, the function calling relation is recorded to be represented as a function call tree. In the function call tree, a parent node represents the calling function and the child node represents the called function. The use of the function call tree to represent the calling relation between the functions facilitates determining the function which is called frequently and the function which has excessive CPU time overhead, thereby determining the performance bottleneck of the program and further improving the performance of the program. For example, for the function which is called frequently, a more complicated optimization algorithm can be used to perform optimization or the frequency of calling that function can be reduced.

Nowadays, programs usually contain complicated business logic and thus the corresponding function call tree per se is very huge. For example, applications of a business level usually contain more than one hundred thousand invocations and more than 200 invocation levels. Since such applications are very complicated, they have many "noise calling" for auxiliary software modules in addition to actual business logics. The analysis for the huge function call tree needs a large amount of time and efforts. In addition, modern applications are generally based on a complicated framework and the business logics used are usually packaged within the framework, and thus it is difficult to separate these packaged business logics from the framework so as to perform more accurate analysis.

BRIEF SUMMARY

Therefore, a need exists for simplifying the function call tree such that the function call tree can be better used for control flow analysis to find possible performance bottlenecks.

Embodiments of the present invention provide a method, apparatus and computer program product for control flow analysis.

A method for control flow analysis according to an embodiment of the present invention includes, for instance: acquiring an original function call tree of a program, wherein nodes of the original function call tree represent functions and a parent/child relation between the nodes represents a calling relation; generating a corresponding function dominator tree from the calling relation, wherein nodes of the function dominator tree represent the functions and a parent/child relation between the nodes represents a dominator relation, wherein a first function dominates a second function if all the invocations to the second function are originated by the first function; and simplifying the original function call tree according to the function dominator tree so as to obtain a simplified function call tree.

An apparatus for control flow analysis according to an embodiment of the present invention includes, for instance: acquiring means configured to acquire an original function call tree of a program, wherein nodes of the original function call tree represent functions and a parent/child relation between the nodes represents a calling relation; generating means configured to generate a corresponding function dominator tree from the calling relation, wherein nodes of the function dominator tree represent the functions and a parent/child relation between the nodes represents a dominator relation, wherein a first function dominates a second function if all the invocations to the second function are originated by the first function; and simplifying means configured to simplify the original function call tree according to the function dominator tree so as to obtain a simplified function call tree.

According to embodiments of the present invention, the call tree for control flow analysis can be simplified.

DETAILED DESCRIPTION

Figure 1:
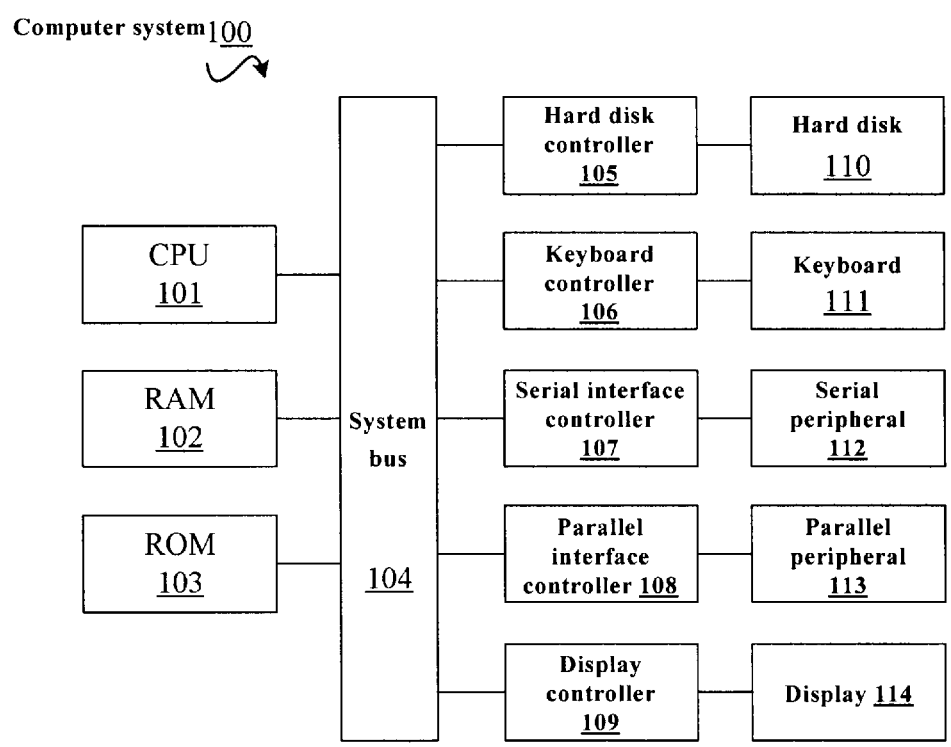
FIG. 1 is a block diagram of an illustrated computing system 100 for realizing an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer readable medium(s) may be utilized. The computer readable medium may be a computer readable signal medium or a computer readable storage medium. The computer readable storage medium may be, for example, but not limited to, an electronic, magnetic, optical, electromagnetic, infrared, or semiconductor system, apparatus, device, or propagation medium. More specific examples (a non-exhaustive list) of the computer readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any suitable combination of above. In the context of this document, a computer readable storage medium may be any tangible medium that contains or stores a program for use by or in connection with an instruction execution system, apparatus, or device.

A computer readable signal medium may include a data signal with computer readable program code embodied therein, propagated in baseband or as part of a carrier wave. Such propagated signal may be in a plurality of forms, including but not limited to electromagnetic signal, optical signal or any suitable combinations of above. The computer readable signal medium may not be the computer readable storage medium but may be any computer readable medium capable of transmitting, propagating or transferring a program for use by or in connection with an instruction execution system, apparatus, or device. The program code contained on the computer readable medium may be transmitted using any appropriate medium, including but not limited to wireless, wireline, optical fiber cable, RF, etc. and any suitable combination of the above.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

In the following, aspects of the present invention will be described in conjunction with particular embodiments. Thus, the description is only for illustration purpose and not intended to limit the scope of the present invention.

FIG. 1 shows an example of a block diagram of a computer system 100 for realizing an embodiment of the present invention. As shown in FIG. 1, a computer system 100 may include a CPU (computer processing unit) 101, a RAM (random access memory) 102, a ROM (read only memory) 103, a system bus 104, a hard disk controller 105, a keyboard controller 106, a serial interface controller 107, a parallel interface controller 108, a display controller 109, a hard disk 110, a keyboard 111, a serial peripheral equipment 112, a parallel peripheral equipment 113 and a display 114. Among these devices, the CPU 101, the RAM 102, the ROM 103, the hard disk controller 105, the keyboard controller 106, the serial interface controller 107, the parallel interface controller 108, the display controller 109 are coupled with the system bus 104. The hard disk 110 is coupled with the hard disk controller 105, the keyboard 111 is coupled with the keyboard controller 106, the serial peripheral equipment 112 is coupled with the serial interface controller 107, the parallel peripheral equipment 113 is coupled with the parallel interface controller 108, and the display 114 is coupled with the display controller 109. It should be understood that the structural block diagram as shown in FIG. 1 is only shown for illustration purposes but not as a limitation to the scope of aspects of the present invention. In certain situations, some devices may be added or removed according to the particular conditions.

In order to simplify the call tree, a method for filtering may be considered. Obviously, a method which analyzes nodes on the call tree one-by-one to determine whether the nodes should be removed from the call tree is not realistic. A relatively realistic method is setting a filter standard by an analyst, and filtering the call tree according to the filter standard. For example, in order to remove the node of a library function of a Java software development kit (SDK) in the call tree, the filter standard can be set as "removing the node having the name beginning with the character of java/". Furthermore, for example, the node with called times less than a certain threshold can be removed from the call tree, that is, the filter standard is set as "removing the node with called times less than a threshold". To use the filter method, the analyst is to have a very profound understanding of the program. If the filter standard is not appropriately set, the effect of simplifying the function call tree cannot be realized or the key nodes may be removed from the call tree which will result in the loss of key information. Furthermore, converting the actual filter requirement into an executable filter standard calls for a very high demand for the analyst. For example, not all the names of the library node of the Java software development kit (SDK) begin with the character of "java/".

Figure 2:
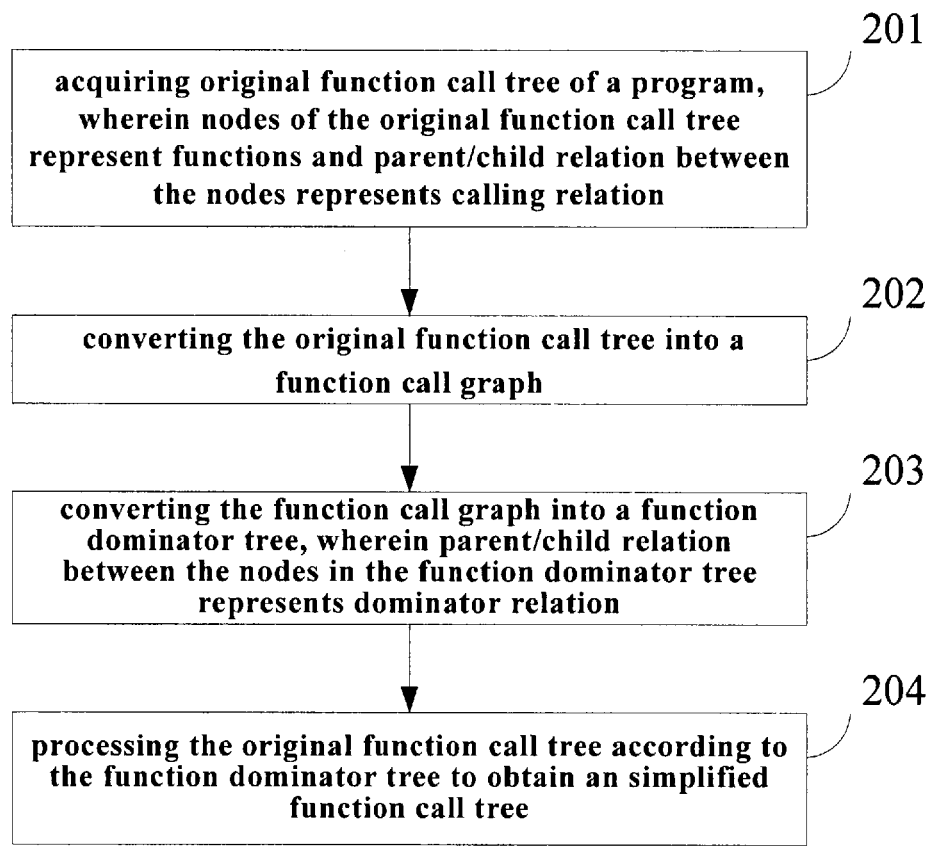
FIG. 2 is a flowchart of a method for control flow analysis according to an embodiment of the present invention.

In the following, a method for performing control flow analysis according to an embodiment of the present invention will be described with reference to FIG. 2. In the following description, a function corresponds to a node.

At step 201, an original function call tree of a program is acquired, wherein a node of the original function call tree represents a function, and a parent/child relation between the nodes of the original function call tree represents a calling relation.

Those skilled in the art may acquire the original function call tree of the program through a plurality of means; for example, the original function call tree may be acquired from source codes or object codes through a method of static analysis, or the original function call tree may be acquired through a method of dynamic analysis during execution of the program. In one method of dynamic analysis, operations such as stack-in, skip etc. are to be performed when the calling function performs a call, and operations such as stack-out, skip are to be performed thereby the calling can be identified.

An illustrated original function call tree is shown in FIG. 3(a). In a path at the bottom, function B calls function C, function C calls function E, function E calls function G, and function G calls function H. A calling function may call a plurality of called functions, and these different callings are represented as different paths on the original function call tree. For example, the case that function A calls function C, function C calls function D and the case that function A calls function C, function C calls function E are different two paths.

Function A and function B are not called by any other functions.

At step 202, the original function call tree of the program is converted into a function call directed graph.

Converting a tree structure into a directed graph structure is commonly-used technical means in the art, and thus will not be described in details here. It should be noted that when the original function call tree is converted into the function call directed graph, a same function on the different paths of the original function call tree only corresponds to one node of the function call directed graph, but different calling relations related to the function on the original function call tree correspond to different directional sides on the function call directed graph.

FIG. 3(b) is a function call directed graph corresponding to the original function call tree of FIG. 3(a). In FIG. 3(a), function C occurs three times and corresponds to four calling relations which are as follows:

Function A calls function C, and function C calls function D;

Function A calls function C, and function C calls function E;

Function B calls function C, and function C calls function E.

In FIG. 3(b), function C only corresponds to one node C, but has four directional sides related to node C.

The following are examples of the pseudo code for performing step 202 according to an embodiment of the present invention:

```
PROCEDURE CALL_TREE_TO_CALL_GRAPH
BEGIN
    FOR each node as CALLER on call tree DO
    FOR each child as CALLEE of CALLER DO
        add {CALLER, CALLEE} as edge into call graph
    ENDFOR
    ENDFOR
END
```

At step 203, the function call directed graph is converted into a function dominator tree, wherein the parent/child relation in the function dominator tree represents a dominator relation.

In the function dominator tree, a parent node dominates a child node. The dominator relation is defined as follows, for example:

If function X must be called before calling function Y from entry to a program, function X dominates function Y. In other words, if all the calls to function Y are originated by function X, function X dominates function Y. The "origination" here refers to the case that function X calls function Y directly as well as the case that function X calls a third function and the third function calls function Y. If function X dominates function Y, and function X does not dominate other functions dominating function Y, function X dominates function Y directly.

It can be seen from FIG. 3(b) that function A and function B are not called by any other functions, thus function A and function B are not dominated by any functions. If function C is to be called, it may be called through function A or it may be called through function B, thus both function A and function B do not dominate function C, and function C is not dominated by any functions either. Therefore, on the function dominator tree, function C is at the same level as function A and function B.

It also can be seen from FIG. 3(b) that, if function D, function E, function F, function G or function H is to be called, function C must be gone through, therefore, function C dominates function D, function E, function F, function G and function H, wherein function C dominates function D and function E directly.

Regarding function H, it may be called through a path of function C→function D→function F→function H, and it may also be called through a path of function C→function E→function G→function H. Therefore, function H is dominated by function C, but is not dominated by any one of function D, function E, function F or function G.

Regarding function D and function F, since function D must be gone through when function F is called but function F is not necessarily gone through when function D is called, function D dominates function F but function F does not dominate function D.

Similarly, dominator relations between other functions can be derived thereby the function dominator tree as shown in FIG. 3(c) can be obtained.

It can be seen from the above description that the function dominator tree is based on the calling relation between the functions. The information on the calling relation is recited in the original function call tree. Therefore, the function dominator tree as shown in FIG. 3(c) can be obtained directly from the original function call tree as shown in FIG. 3(a) by omitting step 202.

Examples of the pseudo code for performing step 203 according to an embodiment of the present invention are as follows:

```
PROCDEDURE BUILD_DOMINATOR_TREE
BEGIN
    FOR each node, as N, in CALL_GRAPH DO
    BEGIN
        put all nodes in CALL_GRAPH to N's dominator set, DOM(N)
    ENDFOR
    CHANGED = TRUE
    WHILE (CHANGED) DO
    BEGIN
        CHANGED = FALSE
        VISIT each node, as N, in CALL_GRAPH in reversed post order
            Define nodes set S(N)
            IF N has precedent nodes THEN
                S(N) = DOM(N)
                FOR each precedent node of N, as P, DO
                    S(N) = S(N) ∩ DOM (P)
                ENDFOR
            ELSE
                S(N) = Φ
            ENDIF
                add N to S(N)
                IF DOM(N) != S(N) THEN
                BEGIN
```

-continued

```
            DOM(N) = S(N)
            CHANGED = TRUE
        ENDIF
     ENDVISIT
  ENDWHILE
END
```

At step 204, the original function call tree is processed according to the function dominator tree obtained at step 203 to obtain an simplified function call tree.

Figure 3:
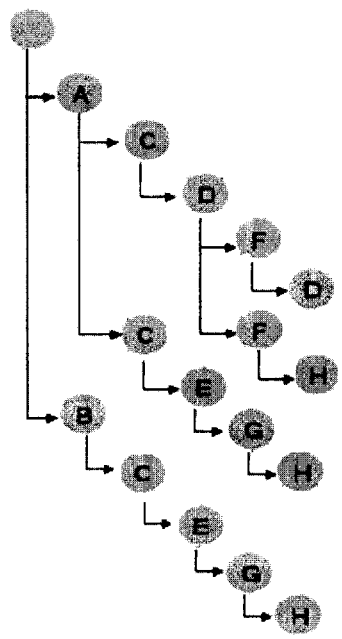
FIG. 3(a) to FIG. 3(d) are illustrated diagrams of processes of a method for control flow analysis according to an embodiment of the present invention.
Figure 3:
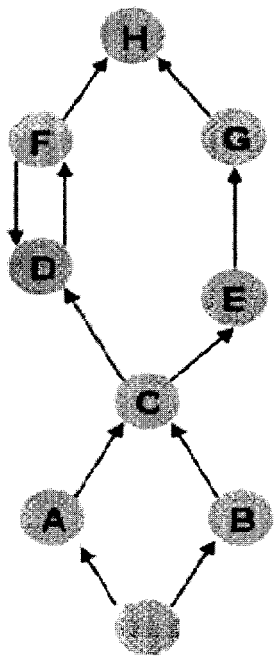

It can be seen from FIG. 3(*c*) that, the functions which are not dominated by any functions include function A, function B and function C. These functions have different dominator properties as shown in FIG. 3(*a*) and FIG. 3(*b*), wherein function A and function B are not called by any other functions and such functions can be called weak dominator functions. Function C is called as strong dominator function which is characterized by that (1) function C dominates at least one other function; (2) function C is called by a plurality of other functions (function A and function B); and (3) there has no strong dominator function which dominates all of these plurality of other functions.

Function H does not dominate other functions, thus the above condition (1) is not satisfied, so function H is not the strong dominator function. Even function H dominates other functions, it is not the strong dominator function because of the following reasons: although function H is called by function F and function G, that is, the above condition (2) is satisfied, the strong dominator function C dominates function F and function G, that is, the above condition (3) is not satisfied.

Function F does not dominate other functions, thus the above condition (1) is not satisfied, so function F is not the strong dominator function. If function F dominates other functions, the above condition (1) is satisfied. If furthermore, function F is called by a plurality of other functions, for example, function F is called by function D and function E, the above condition (2) is satisfied. If function C dominating all of function D and function E is not the strong dominator function, the above condition (3) is satisfied. In this way, function F can become the strong dominator function. Similarly, function G can become the strong dominator function under the case that varying conditions are satisfied.

As described above, in a method of dynamic analysis, calling is detected by capturing actions such as stack-in, stack-out, skip etc. These actions such as stack-in, stack-out, skip etc. may occur within some basic function packages. The basic function package envelops codes for performing some general functions and generally has been optimized. An Application Programming Interface (API) is a typical basic function package. General applications realize general functions by calling a particular API and do not need to understand detailed implementation inside the API. API has been optimized during envelopment, thus there has little optimization space left. In addition, some API is provided in form of object code, thus it is hard to perform optimization. The feature of the strong dominator function is identical with the feature of entry function of the basic function package, thus identifying the strong dominator function from the function dominator tree can identify the entry function of the basic function package. In the subsequent analysis, the analysis to the inside of API can be omitted, thereby analysis may be more focused on the application per se.

In particular, the original function call tree may be traversed, if a node corresponds to the strong dominator function, all the child nodes of the node are removed so as to obtain a simplified function call tree. The removing here may be merging the child nodes to the node corresponding to the strong dominator function, or may be deleting the child nodes. In the former embodiment, if required, the node corresponding to the strong dominator function may be spread to obtain information inside the basic function package. FIG. 3(*d*) shows the simplified function call tree obtained by simplifying the original function call tree of FIG. 3(*a*).

Examples of the pseudo code for performing step 204 according to an embodiment of the present invention are as follows:

```
PROCEDURE SIMPLIFY_CALL_TREE
BEGIN
  CALL BUILD_DOMINATOR_TREE
    NAME_LIST = Φ
    FOR each tree in DOMINATOR_TREE, DO
      N = tree root node
         CALL GET_STRONG_DOMINATORS(N, NAME_LIST)
      ENDFOR
      /* Many options the implementation could have: aggressive grouping,
conservative grouping, and so on */
         CALL GROUP_NODES
END
/* Reference implementation of getting strong dominators. */
/* Strong dominator with two attributes */
/* (1) It dominates other methods, which works for dominator method
only. */
/* (2) It's called by at least two different methods.*/
PROCEDURE GET_STRONG_DOMINATORS (N, NAME_LIST)
  IF N has children THEN
    IF N has more than one incoming edges in CALL_GRAPH THEN
       add N to NAME_LIST
    ELSE
       FOR each child of N, as C, DO
           CALL GET_STRONG_DOMINATORS(C, NAME_LIST)
       ENDFOR
    ENDIF
  ENDIF
END
/* Reference implementation of conservative grouping. */
PROCEDURE GROUP_NODES
BEGIN
    FOR each leaf node on CALL_TREE DO
       build CALL_STACK from the top to leaf node
       FOR each node in CALL_STACK from leaf node to top DO
          /* Group the deepest node only */
          IF NAME_LIST contains node's name THEN
              add node to TO_GROUP_LIST
              BREAK;
          ENDIF
       ENDFOR
    ENDFOR
    FOR each node in TO_GROUP_LIST DO
       group node
    ENDFOR
END
```

According to a method of the present invention, the call tree can be simplified and such simplification embodies not only on nodes count of the call tree, but also on level depth of the call tree. As a real example, an original function call tree with 62301 nodes and 19 levels is processed, after which a simplified function call tree with 16303 nodes and 14 levels is obtained.

A method according to an embodiment of the present invention can be used in combination with the method based on the filter standard. For example, the functions inside the basic function package such as API may be firstly removed by the method according to an embodiment of the present invention, then the filter based on the filter standard such as calling times is performed for the simplified function call tree.

Figure 4:
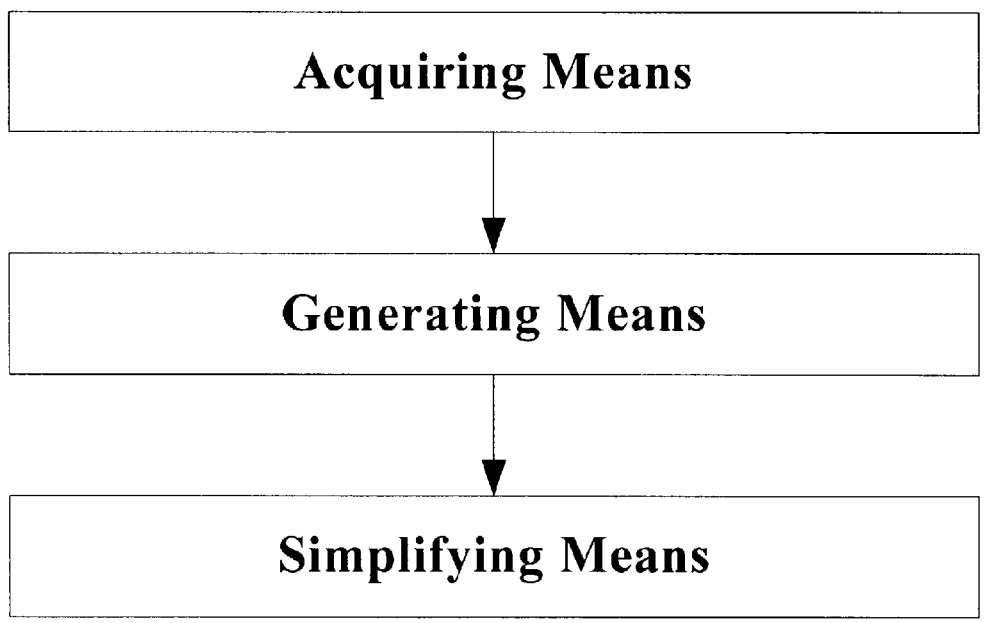
FIG. 4 is a block diagram of an apparatus for control flow analysis according to an embodiment of the present invention.

FIG. 4 is a block diagram of an apparatus for control flow analysis according to an embodiment of the present invention.

The apparatus includes, for instance: acquiring means configured to acquire an original function call tree of a program, wherein nodes of the original function call tree represent functions and a parent/child relation between the nodes represents a calling relation; generating means configured to generate a corresponding function dominator tree from the calling relation, wherein nodes of the function dominator tree represent the functions and a parent/child relation between the nodes represents a dominator relation, wherein a first function dominates a second function if all the invocations to the second function is originated by the first function; and simplifying means configured to simplify the original function call tree according to the function dominator tree so as to obtain a simplified function call tree.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the various methods and apparatus according to aspects of the present invention have been described in detail above in combination with the specific embodiments, aspects of the present invention are not limited thereto. Those skilled in the art could make various variations, substitutions and modifications to aspects of the present invention according to the teaching of the specification, without departing from the spirit and scope of aspects of the invention. It should be appreciated that all these variations, substitutions and modifications still fall into the scope of protection of aspects of the present invention. The scope of protection of aspects of the present invention is defined by the accompanying claims.

What is claimed is:

1. A method for control flow analysis, the method comprising:
   acquiring an original function call tree of a program, wherein nodes of the original function call tree represent functions and a parent/child relation between the nodes represents a calling relation;
   generating a corresponding function dominator tree from the calling relation, wherein nodes of the function dominator tree represent the functions and a parent/child relation between the nodes represents a dominator relation, wherein a first function dominates a second function if all the invocations to the second function are originated by the first function; and
   simplifying the original function call tree according to the function dominator tree so as to obtain a simplified function call tree, wherein the simplifying comprises:
      identifying an entry function of a basic function package according to the function dominator tree; and
      removing children nodes of a node corresponding to the entry function from the original function call tree so as to obtain the simplified function call tree, wherein the removing comprises deleting the children nodes.

2. The method according to claim 1, wherein generating the corresponding function dominator tree from the calling relation comprises:
   converting the original function call tree into a function call directed graph; and
   converting the function call directed graph into a function dominator tree.

3. The method according to claim 1, wherein identifying the entry function of the basic function package according to the function dominator tree comprises:
   identifying a strong dominator function in the function dominator tree, wherein the strong dominator function is called by a plurality of other functions and there are no other strong dominator functions dominating all the plurality of other functions; and
   using the strong dominator function as the entry function.

4. The method according to claim 1, further comprising:
   filtering the simplified function call tree according to a filter standard.

5. A computer system for control flow analysis, the computer system comprising:
   a memory; and
   a processor in communications with the memory, wherein the computer system is configured to perform a method, the method comprising:
      acquiring an original function call tree of a program, wherein nodes of the original function call tree represent functions and a parent/child relation between the nodes represents a calling relation;
      generating a corresponding function dominator tree from the calling relation, wherein nodes of the function dominator tree represent the functions and a parent/child relation between the nodes represents a dominator relation, wherein a first function dominates a second function if all the invocations to the second function are originated by the first function; and
      simplifying the original function call tree according to the function dominator tree so as to obtain a simplified function call tree, wherein the simplifying comprises:
         identifying an entry function of a basic function package according to the function dominator tree; and
         removing children nodes of a node corresponding to the entry function from the original function call tree so as to obtain the simplified function call tree, wherein the removing comprises deleting the children nodes.

6. The computer system according to claim 5, wherein the generating comprises:
   converting the original function call tree into a function call directed graph; and
   converting the function call directed graph into a function dominator tree.

7. The computer system according to claim 5, wherein the identifying the entry function of the basic function package according to the function dominator tree comprises:
   identifying a strong dominator function in the function dominator tree, wherein the strong dominator function is called by a plurality of other functions and there has no other strong dominator functions dominating all the plurality of other functions; and
   using the strong dominator function as the entry function.

8. The computer system according to claim 5, further comprising:
   filtering the simplified function call tree according to a filter standard.

9. A computer program product for control flow analysis, the computer program product comprising:
a non-transitory computer readable storage medium readable by a processing circuit and storing instructions for execution by the processing circuit for performing a method comprising:
acquiring an original function call tree of a program, wherein nodes of the original function call tree represent functions and a parent/child relation between the nodes represents a calling relation;
generating a corresponding function dominator tree from the calling relation, wherein nodes of the function dominator tree represent the functions and a parent/child relation between the nodes represents a dominator relation, wherein a first function dominates a second function if all the invocations to the second function are originated by the first function; and
simplifying the original function call tree according to the function dominator tree so as to obtain a simplified function call tree, wherein the simplifying comprises:
identifying an entry function of a basic function package according to the function dominator tree; and
removing children nodes of a node corresponding to the entry function from the original function call tree so as to obtain the simplified function call tree, wherein the removing comprises deleting the children nodes.

10. The computer program product according to claim 9, wherein generating the corresponding function dominator tree from the calling relation comprises:
converting the original function call tree into a function call directed graph; and
converting the function call directed graph into a function dominator tree.

11. The computer program product according to claim 9, wherein identifying the entry function of the basic function package according to the function dominator tree comprises:
identifying a strong dominator function in the function dominator tree, wherein the strong dominator function is called by a plurality of other functions and there are no other strong dominator functions dominating all the plurality of other functions; and
using the strong dominator function as the entry function.

12. The computer program product according to claim 9, wherein the method further comprises:
filtering the simplified function call tree according to a filter standard.

\* \* \* \* \*